United States Patent
Schürg et al.

(10) Patent No.: US 9,290,271 B2
(45) Date of Patent: Mar. 22, 2016

(54) VEHICLE SEAT CARRIER DEVICE

(71) Applicant: RECARO Aircraft Seating GmbH & Co. KG, Schwaebisch Hall (DE)

(72) Inventors: Christoph Schürg, Schwaebisch Hall (DE); Tim Schreyer, Schwaebisch Hall (DE)

(73) Assignee: RECARO Aircraft Seating GmbH & Co. KG, Schwaebisch Hall (DE)

(*) Notice: Subject to any disclaimer, the term of this patent is extended or adjusted under 35 U.S.C. 154(b) by 0 days.

(21) Appl. No.: 14/133,730

(22) Filed: Dec. 19, 2013

(65) Prior Publication Data

US 2014/0175847 A1   Jun. 26, 2014

(30) Foreign Application Priority Data

Dec. 21, 2012   (DE) .......................... 10 2012 112 943

(51) Int. Cl.
*B64D 11/06* (2006.01)
*B60N 3/00* (2006.01)

(52) U.S. Cl.
CPC *B64D 11/06* (2013.01); *B60N 3/00* (2013.01); *B64D 11/0624* (2014.12)

(58) Field of Classification Search
CPC ....... B60N 3/00; B64D 11/06; B64D 11/0624
USPC ............................ 297/188.04, 188.06, 188.07
See application file for complete search history.

(56) References Cited

U.S. PATENT DOCUMENTS

| | | | | |
|---|---|---|---|---|
| 3,019,050 | A | * | 1/1962 | Spielman .................... 297/217.3 |
| 4,836,602 | A | * | 6/1989 | d'Almada Remedios et al. .......................... 297/188.06 |
| 5,292,174 | A | * | 3/1994 | Ohnuma ................... 297/188.07 |
| 6,059,358 | A | * | 5/2000 | Demick et al. ............ 297/188.04 |
| 6,199,948 | B1 | * | 3/2001 | Bush et al. .................. 297/217.3 |
| 6,702,375 | B1 | * | 3/2004 | Laskowski et al. ....... 297/188.07 |
| 8,141,948 | B2 | * | 3/2012 | Cassellia et al. ............ 297/217.3 |
| 2004/0239155 | A1 | * | 12/2004 | Fourrey et al. ................. 297/163 |
| 2005/0110310 | A1 | * | 5/2005 | Mayer et al. .............. 297/188.06 |
| 2008/0252111 | A1 | | 10/2008 | Rothkop et al. |
| 2010/0244505 | A1 | * | 9/2010 | Demick et al. ........... 297/188.04 |
| 2011/0278885 | A1 | * | 11/2011 | Procter et al. ................. 297/135 |
| 2011/0316311 | A1 | | 12/2011 | Westerink et al. |

(Continued)

FOREIGN PATENT DOCUMENTS

DE       93 10 641 U1    9/1993
DE   20 2006 003 018 U1   6/2006

(Continued)

OTHER PUBLICATIONS

Extended European Search Report dated May 21, 2014 issued in corresponding EP patent application No. 13190603.4-1754 (and partial English translation).

(Continued)

*Primary Examiner* — Peter Brown
(74) *Attorney, Agent, or Firm* — Posz Law Group, PLC

(57) ABSTRACT

A vehicle seat carrier device includes at least one vehicle seat carrier unit which is provided to be arranged in at least one assembled state on at least one backrest unit of a seat unit. The vehicle seat carrier unit has at least one base unit and at least one cover unit which is embodied separately from the base unit and which is provided to be connected to the base unit in the assembled state.

12 Claims, 4 Drawing Sheets

(56) References Cited

U.S. PATENT DOCUMENTS

2012/0120626 A1    5/2012    Akaike
2012/0139303 A1*   6/2012    Westerink et al. ............ 297/163

FOREIGN PATENT DOCUMENTS

DE    10 2008 012 831 A1    10/2008
DE    10 2009 052 684 A1    7/2010

OTHER PUBLICATIONS

German Search Report dated Aug. 21, 2013 issued in the corresponding DE patent application No. 10 2012 112 943.6 (partial English translation attached).

* cited by examiner

VEHICLE SEAT CARRIER DEVICE

CROSS REFERENCE TO RELATED APPLICATION

This application is based on and incorporates herein by reference German Patent Application No. 10 2012 112 943.6 filed on Dec. 21, 2012.

PRIOR ART

The invention relates to a vehicle seat carrier device according to claim 1.

There has already been proposed a vehicle seat carrier device, in particular an aircraft seat carrier device, having at least one vehicle seat carrier unit which is provided to be arranged in at least one assembled state on at least one backrest unit of a seat unit. The vehicle seat carrier unit is in the form of a single coherent piece.

An object of the invention is particularly to provide a generic device which has improved properties with regard to flexibility. The object is achieved according to the invention by the features of patent claim 1 whilst the dependent claims relate to advantageous embodiments and developments of the invention.

Advantages of the Invention

The invention is based on a vehicle seat carrier device, in particular an aircraft seat carrier device, having at least one vehicle seat carrier unit which is provided to be arranged in at least one assembled state on at least one backrest unit of a seat unit.

It is proposed that the vehicle seat carrier unit have at least one base unit and at least one cover unit which is embodied separately from the base unit and which is provided to be connected to the base unit in the assembled state. For example, it is conceivable for the vehicle seat carrier unit to be constructed at least partially in one piece with the backrest unit, at least one unit, in particular the base unit, of the vehicle seat carrier unit being in the form of the backrest unit. In particular, the vehicle seat carrier unit is in the form of a unit embodied separately from the backrest unit. Preferably, the vehicle seat carrier unit is provided to be mounted on the backrest unit of the seat unit in the assembled state. The term "vehicle seat carrier unit" is intended to be understood to be in particular a unit which in the assembled state is in the form of a carrier unit of at least one other component. The term "carrier unit" is intended to be understood to be in particular a unit which in the assembled state is provided to carry a weight force of the other component at least partially. The carrier unit is preferably provided to discharge forces acting on the carrier unit in the assembled state. In particular, the carrier unit has at least one longitudinal carrier direction. Preferably, the carrier unit has at least one transverse carrier direction. In particular, the longitudinal carrier direction has a value greater than or equal to a value of the transverse carrier direction. Preferably, the longitudinal carrier direction and the transverse carrier direction define at least one carrier plane. In particular, the carrier unit has at least one depth carrier direction which is orientated at least substantially perpendicularly to the longitudinal carrier direction and at least substantially perpendicularly to the transverse carrier direction. The depth carrier direction is preferably orientated at least substantially perpendicularly to the carrier plane. In particular, the carrier plane is orientated at least substantially parallel with a plane defined by the backrest unit of the seat unit. The carrier unit preferably has at least one longitudinal carrier extent which is orientated at least substantially parallel with the longitudinal carrier direction. In particular, the carrier unit has at least one transverse carrier extent which is orientated at least substantially parallel with the transverse carrier direction. For example, the carrier unit is provided to carry at least partially a weight force of a stretcher device in the assembled state and to discharge it, preferably into the backrest unit of the seat unit. It is also conceivable for the carrier unit to be in the form of an auxiliary standing means for a passenger who is sitting in a seat unit arranged behind the seat unit in relation to a depth carrier direction and to be provided in order to carry and discharge a force acting on the carrier unit as a result of the passenger. The term "seat unit" is intended to be understood to be in particular a unit having at least one backrest unit, having at least one seat base unit and at least one support unit. In particular, the backrest unit is connected in a pivotable manner to the seat base unit. Alternatively, it is conceivable for the backrest unit to be connected rigidly to the seat base unit. It is further conceivable for the seat unit to have an armrest unit which is pivotably supported and which is provided to form a support of an arm of a passenger. The term "base unit" is intended to be understood to be in particular a unit which in the assembled state is in the form of a carrier unit at least partially. In particular, the base unit is provided, in the assembled state in addition to the construction as a carrier unit, to carry the cover unit. The base unit in the assembled state is preferably connected to the cover unit, preferably in a releasable manner. In particular, the base unit has at least one connection unit which is provided for connection of the cover unit. The term a "cover unit" is intended to be understood to be in particular a unit which in the assembled state is connected to the base unit, in particular in a releasable manner. In particular, the cover unit is in the form of a cover of the base unit. The cover unit is preferably provided at least partially to cover the base unit in the assembled state. The expression that the cover unit is provided "at least partially to cover" in the assembled state is intended to be understood to mean in particular that, in the case of a vehicle seat carrier unit which is at least partially integrally formed with the backrest unit, the cover unit in the assembled state covers more than 5%, preferably more than 8% and in particular more than 10%, of a surface of the base unit. The expression that the cover unit is provided "at least partially to cover" the base unit in the assembled state is intended to be understood to mean in particular that, in the case of a vehicle seat carrier unit which is embodied separately from the backrest unit, the cover unit in the assembled state covers more than 80%, preferably more than 90% and in particular more than 95%, of a surface of the base unit. The expression that the cover unit is provided to be "connected" to the base unit in the assembled state is intended to be understood to mean in particular that the cover unit in the assembled state at least partially touches the base unit. The term "support unit" is intended in particular to be understood to mean a unit which is provided to support a seat unit, in particular a seat unit having a seat base unit and having a backrest unit, on a base, in particular on a base of a transport medium. In particular, the support unit is provided to transmit weight forces of the seat unit and, if a person should sit on the seat unit, weight forces of the person sitting on the seat unit and/or acceleration forces which are caused by transport and which act on the person, to the base. The term a "transport medium" is intended to be understood to mean in particular any type of transport medium which is provided with seats and is provided in order to transport persons. For example, a transport medium may be a ship, an omnibus, a motor vehicle, a rail vehicle such as, for example, a train or a tram. Preferably, the transport medium is an aircraft. The expression that a straight line and/or a plane is orientated "at least substantially perpendicularly" relative to another straight line and/or plane which is embodied separately from the first straight line and/or plane is intended to be understood in particular to mean that the straight line and/or plane defines with the additional straight line and/or plane an angle which is different from an angle of 90° by less than 20°, preferably by less than 10° and in particular by less than 5°. The expression that a straight line and/or plane is orientated "at least substantially parallel" with another straight line and/or plane which is embodied separately from the first straight line and/or plane is intended to be understood in particular to mean that the straight line and/or plane defines with the additional straight line and/or plane an angle which is different from an angle of 0° by less than 10°, preferably by less than 5° and in particular by less than 3°. The term "provided" is intended to be understood in particular to mean specially configured and/or provided. The cover unit can advantageously be released quickly and easily from the base unit by a configuration according to the invention in the event of damage to the cover unit and/or the base unit, whereby a level of flexibility can advantageously be increased.

It is further proposed that the vehicle seat carrier unit be formed by a backrest bridge. The term "backrest bridge" is intended to be understood in particular to refer to a unit which is provided to bridge a backrest unit at least partially. In particular, the backrest bridge is provided to connect at least two, preferably lateral, limit members of the backrest unit to each other. The backrest bridge is preferably in the form of the carrier unit. In particular, the backrest bridge has the longitudinal carrier extent having a value which is at least substantially equal to a value of an extent of the backrest unit in a direction which is orientated at least substantially parallel with the longitudinal carrier extent. For example, it is conceivable for the longitudinal carrier extent to be orientated at least substantially parallel with a longitudinal backrest unit extent. In particular, the longitudinal carrier extent is orientated at least substantially parallel with a transverse backrest unit extent. A value of the longitudinal carrier extent is preferably at least substantially equal to a value of the transverse backrest unit extent. In particular, the backrest bridge has the transverse carrier extent which is orientated at least substantially parallel with the longitudinal backrest unit extent. A value of the transverse carrier extent is preferably less than 25%, preferably less than 20% and in particular less than 15% of a value of the longitudinal backrest unit extent. In particular, the backrest bridge is arranged in an upper region of the backrest unit. The term "upper region" of the backrest unit is intended to be understood in particular to be a region of the backrest unit which is arranged, in an upright position of the seat unit, preferably with a longitudinal backrest unit extent orientated at least substantially perpendicularly to the base, in a region of the backrest unit facing away from the support unit of the seat unit. In particular, the upper region of the backrest unit is arranged in relation to a longitudinal backrest unit direction above a value of more than 40%, preferably of more than 50% and in particular of more than 55% of the longitudinal backrest unit extent. The term "longitudinal backrest unit direction" is intended to be understood in particular to be a direction which is orientated at least substantially perpendicularly relative to the base in the upright position of the seat unit. In particular, the longitudinal backrest unit direction is directed in the upright position of the seat unit from the base in the direction of the backrest unit. The term "at least substantially" is intended to be understood in this context in particular to mean that a deviation from a given value differs in particular by less than 25%, preferably by less than 10% and particularly preferably by less than 5% of the given value. A flexibly constructed backrest bridge can advantageously be achieved by a configuration according to the invention.

It is further proposed that the vehicle seat carrier unit have at least one hollow space which is provided to store at least one additional component. The term "hollow space" is intended to be understood in particular to be a space which is delimited by at least one component, in particular by the vehicle seat carrier unit, in particular from at least three and preferably at least four sides. In particular, the hollow space has a hollow space volume which is delimited by the component from the sides. The hollow space is preferably provided for storing the additional component. The term "additional component" is intended to be understood in particular to be a component which has a function which extends beyond a function fulfilled by the seat unit. In particular, the additional component is provided to increase comfort for a passenger. Preferably, the additional component is in the form of an electronic component. In particular, the additional component is in the form of a mechanical component. The mechanical additional component is preferably in the form of a coat hook. It is also conceivable for the mechanical additional component to be in the form of a cup holder. It is further conceivable for the mechanical additional component to be in the form of a pen holder. For example, it is conceivable for the additional component to be in the form of an additional magnetic component which is provided to hold at least one object in at least one position by means of a magnetic retention force. In particular, the additional component in the form of an electronic component is in the form of a USB connection, a LAN connection, an audio connection and/or an electrical connection for connection of an electrical device, for example, a laptop. As a result of a configuration according to the invention, a large number of different additional components can advantageously be stored in the vehicle seat carrier unit, whereby it is flexibly possible to respond to corresponding requirements. Furthermore, it is advantageously possible to produce a modular installation of extremely small electrical components. Furthermore, it is advantageously possible to produce a function combination of different features and therefore to reduce a great variety of components.

It is further proposed that the vehicle seat carrier unit have in an assembled state at least one storage unit for storing at least one personal object. In particular, the vehicle seat carrier unit has in an assembled state at least one deposit surface for the personal object. Advantageously, the storage unit is in the form of the deposit surface. In particular, the storage unit, in particular the deposit surface, is in an assembled state arranged in a contact region of the base unit and the cover unit. Advantageously, the storage unit is in an assembled state in the form of a groove in the contact region of the base unit and the cover unit. The personal object is preferably in the form of a tablet computer. The backrest unit advantageously comprises at least one fixing element for fixing the personal object. Advantageously, the storage unit and the fixing element are provided in at least one fixed state of the personal object to cooperate for storing the personal object. Advantageously, the fixing element is in the form of a band, advantageously a rubber band. Alternatively, it is conceivable for the fixing element to be in the form of a cord. The fixing element could further be in the form of a retaining element and/or an eccentric element, wherein the fixing element could be fitted to the backrest unit by means of a hinge. Furthermore, additional fixing elements which appear to be advantageous to a person skilled in the art are conceivable. As a result of the storage unit of the vehicle seat carrier unit, it is advantageously possible for a personal object to be arranged comfortably, safely and readily on the seat unit.

It is further proposed that the hollow space be formed at least substantially by the base unit and the cover unit. The expression that the hollow space is "formed at least substantially by the base unit and the cover unit" is intended to be understood in particular to mean that one and/or more, preferably lateral, delimitation faces of the hollow space is/are formed by the base unit and the cover unit at a proportion of more than 80%, preferably more than 90% and in particular more than 95% of a value of the delimitation faces. As a result of a configuration according to the invention, a hollow space which is accessible at all times can advantageously be achieved by means of the configuration of the vehicle seat carrier unit with the base unit, preferably releasably connected cover unit. Furthermore, the additional components can be changed in a flexible manner in accordance with requirements.

It is further proposed that the cover unit have at least one receiving unit which is provided to receive the additional component. The term "receiving unit" is intended to be understood in particular to be a unit which is provided to store the additional component in the cover unit. In particular, the receiving unit is in the form of a recess in the cover unit. Preferably, the receiving unit has a geometry which corresponds to the additional component. In particular, the receiving unit is provided to receive the additional component in a flush manner with a cover unit surface. Preferably, an additional component surface of the additional component is arranged at least substantially in a plane defined by the cover unit surface after being received in the receiving unit. The expression that the additional component surface of the additional component is "arranged at least substantially in a plane defined by the cover unit surface" after being received in the receiving unit is intended to be understood in particular to mean that the additional component surface is arranged in the plane defined by the cover unit surface at a proportion of more than 80%, preferably more than 90% and in particular more than 95% of a value of the additional component surface. As a result of a configuration according to the invention, it is advantageously possible for the additional unit to be received safely in the receiving unit of the cover unit. Furthermore, a level of flexibility can be increased by a large number of different additional components. Furthermore, a number of receiving units can be flexibly adapted to respective requirements in a single cover unit.

It is further proposed that the vehicle seat carrier unit have at least one supply access unit which is provided to supply at least one additional electrical component. The term "supply access unit" is intended to be understood in particular to be a unit which has at least one connection location for electrical current. In particular, the vehicle seat carrier unit is provided to receive the electrical current via the connection location of the supply access unit. In particular, the supply access unit has at least one conduction element which is provided to conduct the electrical current. The conduction element is preferably in the form of a power cable. Alternatively, it is conceivable for the supply access unit to have at least one solar cell which is provided to obtain electrical energy, in particular electrical current, by means of ambient light, in particular by means of room lighting. In particular, the supply access unit which has the solar cell is provided to supply the additional electrical component with power, in particular with electrical current. As a result of a configuration according to the invention, it is advantageously possible for the vehicle seat carrier unit to supply at least one electrical component, whereby a range of additional components can be increased.

It is further proposed that the vehicle seat carrier unit have at least one locking unit which is provided to lock at least one object in a storage position. In particular, the object is in the form of a table. Alternatively or additionally, it is conceivable for the object to be in the form of a seat screen unit and/or a lamp, in particular a reading lamp. In particular, the object is pivotably supported on at least one aircraft seat component, in particular on the backrest unit. The term "locking unit" is intended to be understood in particular to be a unit which is provided to lock the object in at least one storage position. In particular, the locking unit is provided to lock the object in the storage position until an active intervention, in particular an active intervention of a passenger. The locking unit is preferably provided to lock the object in the storage position until the locking unit is actuated by the active intervention. In particular, the locking unit is provided to lock the object in the storage position independently of other external influences, in particular concussions and/or other external forces. The term "other external influences" is intended to be understood in particular to be influences which originate from the active intervention, such as, for example, concussions and/or other external forces, such as accelerations, braking actions and/or varying orientations of the object and the locking unit in a space, in particular in an aircraft cabin. The term an "active intervention" is intended to be understood in particular to be an action actively carried out, preferably by a passenger. In particular, the active intervention is in the form of a rotational movement. The active intervention is preferably in the form of a pulling movement and/or a pressing movement. As a result of a configuration according to the invention, it is advantageously possible for the vehicle seat carrier unit to take on a function of the locking unit in addition to the function thereof as a carrier unit, whereby a flexibly constructed vehicle seat carrier unit can be achieved.

It is further proposed that the vehicle seat carrier device have at least one vertical wall strip which is arranged on the base unit and which is provided to delimit at least partially a storage space. The term a "vertical wall strip" is intended to be understood in particular to be a wall strip which is provided to form in the assembled state at least one, preferably lateral, delimitation face of the storage space. In particular, the vertical wall strip has at least one longitudinal wall strip direction which is orientated at least substantially parallel with the transverse carrier direction. In particular, the longitudinal wall strip direction is orientated at least substantially perpendicularly relative to the longitudinal carrier direction. The vertical wall strip preferably has at least one transverse wall strip direction which has a value of less than 40%, preferably of less than 30% and in particular of less than 25% of a value of the longitudinal wall strip direction. The expression that the vertical wall strip is provided to delimit the storage space "at least partially" is intended to be understood in particular to mean that the vertical wall strip forms at least one, preferably lateral, delimitation face of the storage space. The term a "storage space" is intended to be understood in particular to be a space which is delimited by at least one component and in particular from at least two and preferably from at least three sides. In particular, the storage space has a storage space volume which is delimited by the component from the sides. The storage space is preferably accessible via at least one opening which is preferably facing away from the base in the upright position of the seat unit. In particular, the storage space is in the form of a storage space for travel accessories, in particular for printed matter and/or periodicals. The storage space preferably comprises a high literature pocket. As a result of a configuration according to the invention, it is advantageously possible to save another additional component for constructing the storage space, whereby material and costs can be advantageously reduced and a flexible vehicle seat carrier unit can be achieved.

It is further proposed that the vehicle seat carrier unit comprise at least one adjustment unit which is provided to obtain at least one variable dimension. The term "adjustment unit" is intended to be understood in particular to be a unit which is provided to adjust, in particular to change, at least one dimension of the vehicle seat carrier unit. The term a "variable dimension" is intended to be understood in particular to be a dimension which can be changed by at least one unit, in particular by the adjustment unit, in particular in a selective manner. In particular, the variable dimension is orientated at least substantially parallel with the carrier depth direction. It is also conceivable for the variable dimension to be orientated at least substantially parallel with the longitudinal carrier direction. For example, the vehicle seat carrier unit is constructed in a telescope-like manner. It is also conceivable for the vehicle seat carrier unit to have at least one carrier adapter which is provided to be fitted to the vehicle seat carrier unit and to change a dimension of the vehicle seat carrier unit, preferably in the longitudinal carrier direction, in particular in the carrier depth direction. As a result of a configuration according to the invention, it is advantageously possible to achieve a flexible dimension of the vehicle seat carrier unit, which dimension is adjustable on the basis of requirements, respectively.

It is further proposed that the vehicle seat carrier unit be produced at least partially in a casting method. In particular, the vehicle seat carrier unit is produced at least partially in a diecasting method. The vehicle seat carrier unit is preferably produced at least partially in an injection-molding method. The expression that the vehicle seat carrier unit is "produced at least partially in a casting method" is intended to be understood in particular to mean that at least one method step is in the form of a casting method for producing the vehicle seat carrier unit. As a result of a configuration according to the invention, it is advantageously possible for a mold of the vehicle seat carrier unit to be cast so as to be adapted flexibly to requirements. Furthermore, different casting methods can advantageously be used and therefore flexibility can be further increased.

It is further proposed that the vehicle seat carrier unit have at least one additional cover unit which differs from the one cover unit in terms of at least one feature. As a result of a configuration according to the invention, it is advantageously possible for a plurality of cover units which differ from each other in terms of at least one feature to be provided, whereby a cover unit adapted to corresponding requirements can advantageously be used.

Furthermore, a vehicle seat, in particular an aircraft seat, having at least one seat unit and having at least one vehicle seat carrier device according to the invention, is proposed. As a result of a configuration according to the invention, it is advantageously possible for a vehicle seat to be provided with the vehicle seat carrier device according to the invention, whereby a flexible vehicle seat can be achieved.

DRAWINGS

Other advantages will be appreciated from the following description of the drawings. An embodiment of the invention is illustrated in the drawings. The drawings, the description and the claims contain a large number of features in combination. In an advantageous manner, the person skilled in the art will also consider the features individually and combine them to form advantageous additional combinations.

DESCRIPTION OF THE EMBODIMENT

Figure 1:
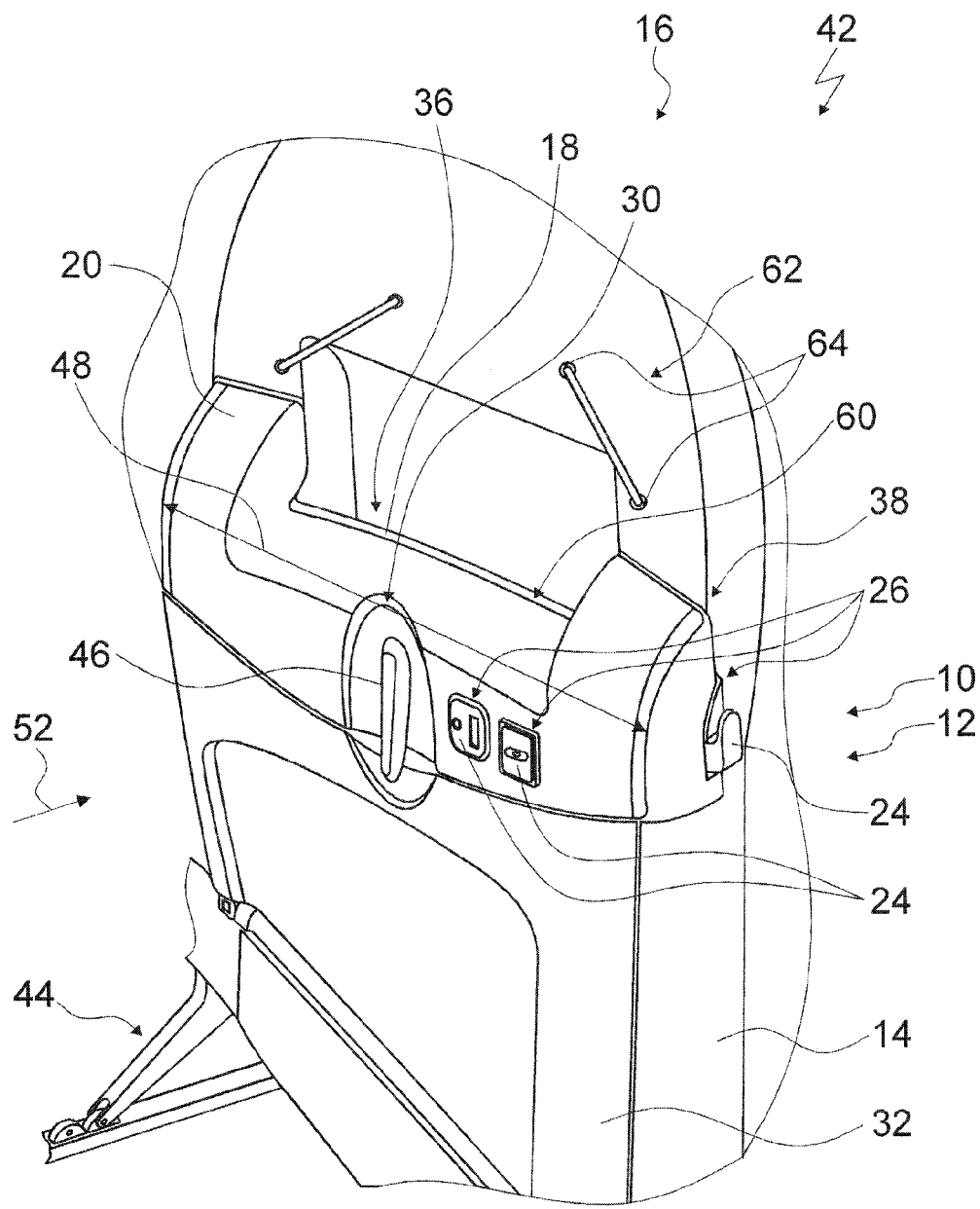
FIG. 1 is a rear view of a cutout of a vehicle seat according to the invention.

FIG. 1 is a rear view of a cutout of a vehicle seat 42 according to the invention, having a seat unit 16 and having a vehicle seat carrier device 10 according to the invention in an assembled state. The vehicle seat 42 is in the form of an aircraft seat. The seat unit 16 has a backrest unit 14. Furthermore, the seat unit 16 has a support unit 44 which is provided to support the seat unit 16 on a vehicle base (not illustrated). The seat unit 16 further has a seat base unit (not illustrated) which is in the form of a seat face for a passenger (not illustrated). The backrest unit 14 is pivotably supported on the seat base unit. It is also conceivable for the seat unit 16 to have an armrest unit (not illustrated).

The vehicle seat carrier device 10 is provided with a vehicle seat carrier unit 12 which is provided to be arranged in the assembled state on the backrest unit 14 of the seat unit 16. The vehicle seat carrier device 10 is in the form of an aircraft seat carrier device. The seat unit 16 has an object 32 which is pivotably supported on the backrest unit 14 of the seat unit 16. The object 32 is in the form of a table. In FIG. 1, the object 32 is arranged in a storage position. The vehicle seat carrier unit 12 has a locking unit 30 which is provided to lock the object 32 in the storage position. The locking unit 30 has a locking element 46 which is pivotably supported on the vehicle seat carrier unit 12. The locking unit 46 is in the form of a toggle. Alternatively, other configurations which appear to be advantageous to a person skilled in the art are conceivable for the locking element. Furthermore, other configurations which appear to be advantageous to a person skilled in the art are conceivable for locking units as an alternative to the locking unit 30.

In the present embodiment, the vehicle seat carrier unit 12 is formed by a backrest bridge. The vehicle seat carrier unit 12 has a longitudinal carrier extent which is orientated substantially parallel with a plane which is defined by the backrest unit 14.

Furthermore, the longitudinal carrier extent 48 is orientated substantially parallel with the seat base unit. The vehicle seat carrier unit 12 is securely connected to the backrest unit 14 in the assembled state. The vehicle seat carrier unit 12 is partially produced in a casting method according to the invention. In the present embodiment, the vehicle seat carrier unit 12 is produced in an injection-molding method. Alternatively, it is conceivable for the vehicle seat carrier unit 12 to be produced in a diecasting method.

Figure 2:
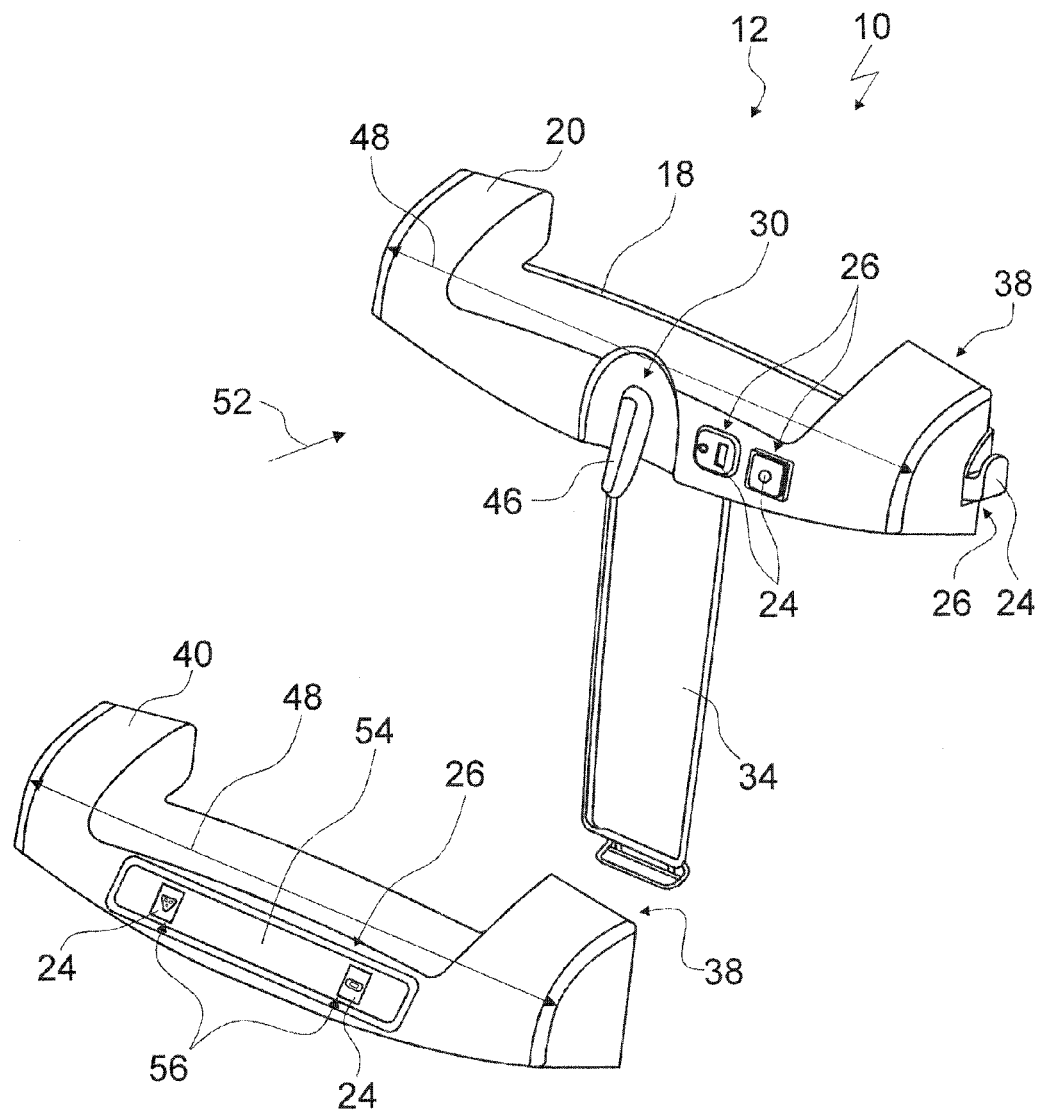
FIG. 2 is a perspective view of a vehicle seat carrier device according to the invention.

FIG. 2 is a perspective view of the vehicle seat carrier device 10 according to the invention. The vehicle seat carrier unit 12 has a base unit 18 and a cover unit 20 which is embodied separately from the base unit 18 and which is provided to be connected to the base unit 18 in the assembled state. FIGS. 1 and 2 illustrate the base unit 18 simply as cutouts because the base unit 18 is covered mainly by the cover unit 20 in the assembled state. The vehicle seat carrier unit is provided according to the invention with a plurality of additional components 24. One of the additional components 24 is in the form of a coat hook. The remaining additional components 24 are in the form of electrical components in the embodiment shown.

Figure 3:
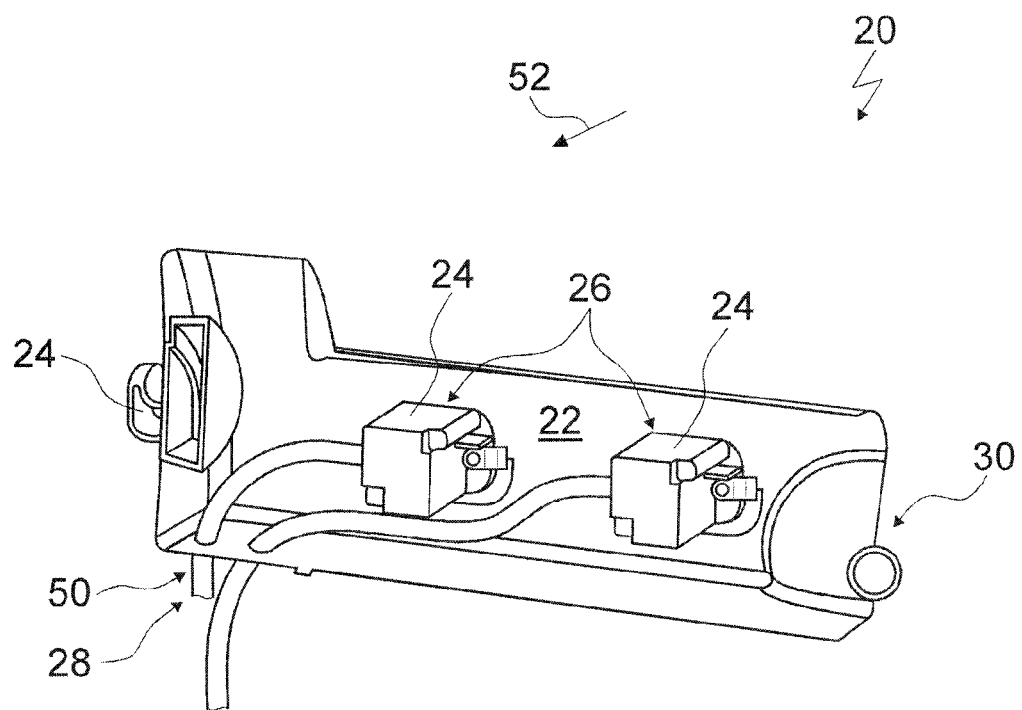
FIG. 3 is a rear view of a cutout of a cover unit according to the invention from FIG. 2

The vehicle seat carrier unit 12 has a hollow space 22 which is provided for storing the additional components 24 (cf. FIG. 3). The hollow space 22 is formed substantially by the base unit 18 and the cover unit 20. In the assembled state, a large portion of the additional components 24 is stored in the hollow space 22. In the assembled state, however, a part-region of the additional components 24 is accessible from a space outside the vehicle seat carrier unit 12; the part-region can be used from the space outside the vehicle seat carrier unit 12. The part-region of the additional components 24 is supported so as to be able to be gripped by the passenger. The cover unit 20 has a receiving unit 26 which is provided to receive the additional component 24. A number of receiving units 26 of the cover unit 20 is equal to a number of additional components 24. A component surface of the additional components 24 is arranged in the assembled state so as to be flush with a cover surface of the cover unit 20.

FIG. 3 is a rear view of a cutout of the cover unit 20 according to the invention from FIG. 2. It can also be seen that the vehicle seat carrier unit 12 has a supply access unit 28 which is provided to supply the additional electrical component 24. Only one of the supply access units 28 is described below because all the supply access units 28 are of identical construction. The supply access unit 28 is in the form of a power cable. The supply access unit 28 has a connection location 50, via which the supply access unit 28 is connected to a power line (not illustrated). A connection of the supply access unit 28 to the power line can be released from the base unit 18 when the cover unit 20 is released. When the cover unit 20 and the base unit 18 are connected again, the supply access unit 28 can be connected to the power line. The power line extends from the vehicle seat carrier unit 12 through a line duct (not illustrated) which extends through the backrest unit 14, the seat base unit and the support unit 44 into the vehicle base.

The seat unit 16 has a storage space 36 which is partially formed by the vehicle seat carrier unit 12 (cf. FIG. 1). In addition to this, the storage space 36 is partially formed by the backrest unit 14. The storage space 36 is provided for receiving travel accessories (not illustrated), such as, for example, printed matter and/or periodicals. The storage space 36 is arranged between the backrest unit 14 and the vehicle seat carrier device 10. The vehicle seat carrier device 10 comprises a vertical wall strip 34 which is arranged on the base unit 18 and which is provided to delimit the storage space 36 partially (cf. FIG. 2). The backrest unit 14 forms a wall of the storage space 36. The vehicle seat carrier unit 12 and the vertical wall strip 34 together form another wall of the storage space 36.

The vehicle seat carrier unit 12 comprises an adjustment unit 38 which is provided to obtain a variable dimension. The vehicle seat carrier unit 12 has a carrier adapter (not illustrated) which is provided to be fitted to the vehicle seat carrier unit 12 and to change the dimension of the vehicle seat carrier unit 12. The adjustment unit 38 is provided to obtain the variable dimension in a carrier depth direction 52. In the assembled state, the carrier depth direction 52 is orientated in the direction of the backrest unit 14 from the vehicle seat carrier unit 12 and substantially perpendicularly to the base unit 18. It is also conceivable for the adjustment unit 38 to be provided to obtain the variable dimension in a longitudinal carrier direction which is orientated substantially parallel with the longitudinal carrier extent 48. For example, a telescope-like construction of the vehicle seat carrier unit 12 is conceivable.

FIG. 2 further shows that the vehicle seat carrier unit 12 has another cover unit 40 which differs from the one cover unit 20 in terms of several features. The additional cover unit 40 has a single receiving unit 26 which is provided to receive a cover plate 54. The cover plate 54 has a plurality of cover plate receiving members 56 which are provided to receive an additional component 24 each. It is alternatively conceivable for the additional cover unit 40 to have a plurality of receiving units 26 which are each provided to receive a cover plate 54. Each of the cover plates 54 has a cover plate receiving member 56 which is provided to receive an additional component 24.

Figure 4:
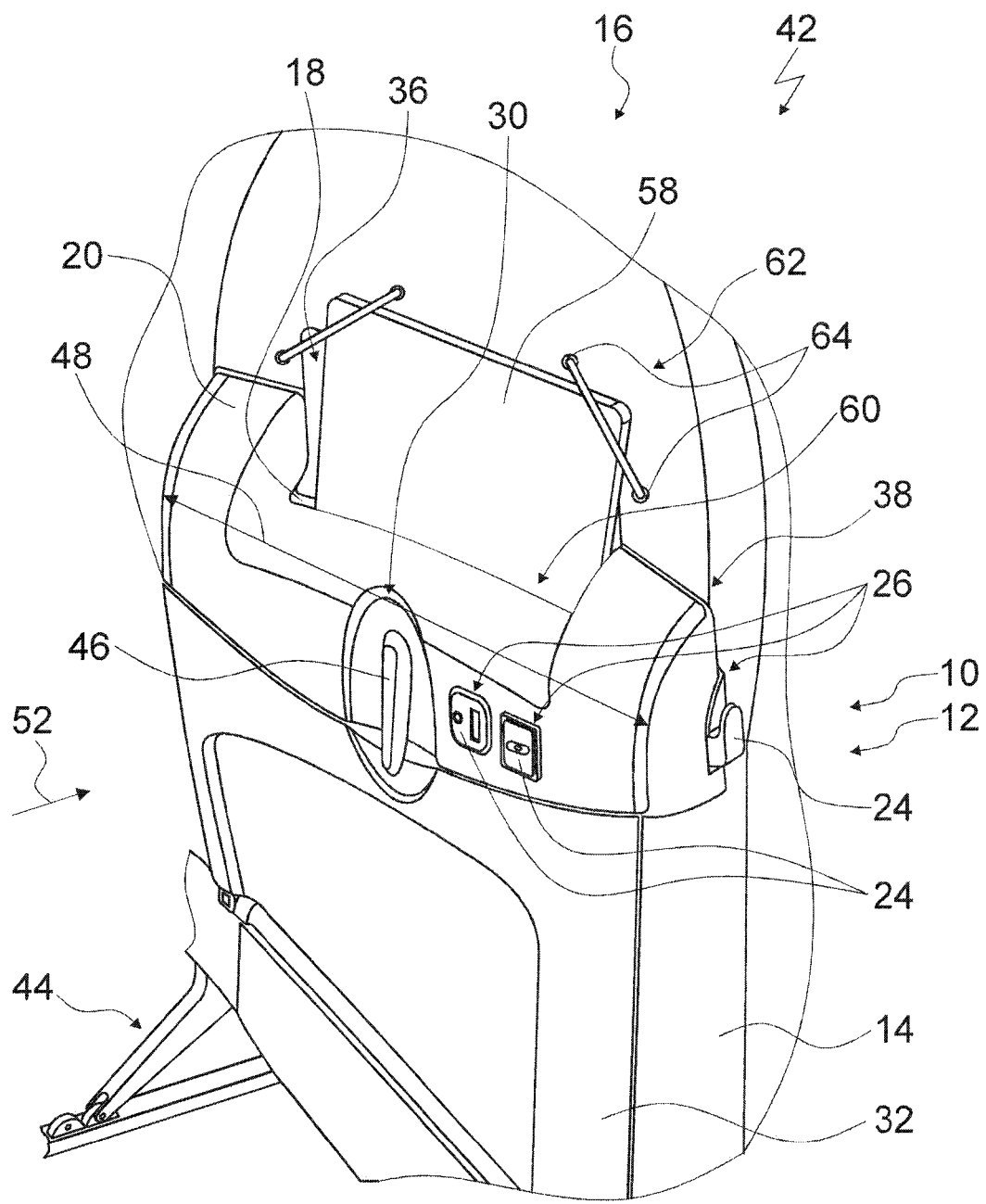
FIG. 4 shows the vehicle seat from FIG. 1 having a personal object fixed to the vehicle seat.

FIG. 4 shows the vehicle seat 42 from FIG. 1 with a personal object 58 fixed to the vehicle seat 42. The personal object 58 is in the form of a tablet computer. The vehicle seat carrier unit 12 has in the assembled state a storage unit 60 for storing the personal object 58. The storage unit 60 is arranged in the assembled state in a contact region of the base unit 18 and the cover unit 20 and is in the form of a deposit face. In this instance, the storage unit 60 is in the form of a groove in the contact region of the base unit 18 and the cover unit 20. The backrest unit 14 has two fixing elements 62 for fixing the personal object 58. Only one of the two fixing elements 62 is described below and is indicated with a reference numeral. The fixing element 62 is in the form of a rubber band. The fixing element 62 is fixed to the backrest unit 14 by means of two fixing means 64. The fixing element 62 is arranged in the state mounted on the backrest unit 14 in a tensioned state.

Alternatively to a configuration of the storage unit 60 as a groove, it is conceivable for the storage unit 60 to be in the form of a step for supporting the personal object 58. In this instance, the storage unit 60 has a projection, on which the personal object 58 can be supported, in a region directed away from the backrest unit 14—in comparison with a region directed towards the backrest unit 14. Alternatively to a configuration of the fixing element 62 as a rubber band, it is conceivable for the fixing element 62 to be in the form of a bracket which is fixed to the backrest unit 14 by means of a clamping element. The fixing element 62 in the form of a bracket is provided to clamp the personal object 58 between the fixing element 62 and the storage unit 60 by means of a clamping force of the clamping element. In this instance, the fixing element 62 in the form of a bracket is provided to be urged in the direction of the storage unit 60 by means of a clamping force of the clamping element of the backrest unit 14.

In a fixed state of the personal object 58 on the seat unit 16, a first side of the personal object 58 is stored in the storage unit 60. A second side of the personal object 58 opposite the side stored in the storage unit 60 is stored on the backrest unit 14. In this instance, the fixing element 62 is provided to engage over a corner of the side of the personal object 58, which side abuts the backrest unit 14. Furthermore, the fixing element 62 is provided to fix the personal object 58 in a position predetermined by the storage unit 60. The storage unit 60 and the fixing element 62 are provided to cooperate in the fixed state of the personal object 58 on the seat unit 16.

LIST OF REFERENCE NUMERALS

10 Vehicle seat carrier device
12 Vehicle seat carrier unit
14 Backrest unit
16 Seat unit 18 Base unit
20 Cover unit
22 Hollow space
24 Additional component
26 Receiving unit
28 Supply access unit
30 Locking unit
32 Object
34 Vertical wall strip
36 Storage space
38 Adjustment unit
40 Additional cover unit
42 Vehicle seat
44 Support unit
46 Locking element
48 Longitudinal carrier extent
50 Connection location
52 Carrier depth direction
54 Cover plate
56 Cover plate receiving member
58 Personal object
60 Storage unit
62 Fixing element
64 Fixing means

The invention claimed is:

1. A vehicle seat having at least one seat unit and at least one vehicle seat carrier device, comprising:
at least one vehicle seat carrier unit arranged in at least one assembled state on at least one backrest unit of a seat unit, the vehicle seat carrier unit having at least one base unit and at least one cover unit, the cover unit being assembled separately from the base unit and being connected to the base unit in an assembled state, wherein
the vehicle seat carrier unit includes a backrest bridge extending across and bridging the backrest unit, the backrest bridge having a carrier lateral-width at least substantially equal to a backrest lateral-width of the backrest unit, the backrest bridge extending substantially parallel to the backrest lateral-width,
the vehicle seat carrier unit has at least one hollow space between the base unit and the cover unit, the hollow space being configured to store at least one electrical component, while allowing access to a part of the electrical component from outside the hollow space, and
the cover unit of the vehicle seat carrier device has at least one locking unit configured to lock an object which is pivotably supported on the backrest unit in a storage position, the object being locked in a storage position on a side of the cover unit facing away from the storage space, and the seat unit has a storage space which is formed by the vehicle seat carrier unit and by the backrest unit, the storage space configured to receive travel accessories including printed matter or periodicals.

2. The vehicle seat according to claim 1, wherein the hollow space is formed at least substantially by the base unit and the cover unit.

3. The vehicle seat at least according to claim 1, wherein the cover unit further includes
an outer-cover surface, and
at least one receiving unit attached to the outer-cover surface and configured to accommodate an additional component.

4. The vehicle seat according to claim 1, wherein the vehicle seat carrier includes at least one supply access unit configured to connect at least one additional electrical component.

5. The vehicle seat according to claim 1, wherein the at least one locking unit further includes at least one fixing element attached to the backrest unit of the seat unit.

6. The vehicle seat according to claim 5, wherein the locking unit is attached to the at least one vehicle seat carrier unit.

7. The vehicle seat according to claim 1, further comprising:
at least one vertical wall strip being arranged on the base unit and in front of the storage space, having at least one longitudinal wall strip length, which is oriented in a direction substantially parallel to a transverse carrier length of the backrest unit, and having at least one transverse wall strip length that is shorter than 40% of the longitudinal wall strip length.

8. The vehicle seat according to claim 1, wherein the vehicle seat carrier unit is produced at least partially in a casting method.

9. The vehicle seat according to claim 1, wherein the vehicle seat carrier unit has at least one second cover unit, which differs from the at least one cover unit in terms of at least one feature, and is configured to replace the at least one cover unit and to removably attach to the base unit.

10. The vehicle seat according to claim 1, wherein the backrest bridge extends in a direction oriented substantially parallel with a plane defined by the backrest unit.

11. The vehicle seat according to claim 1, wherein the locking unit is attached to the at least one vehicle seat carrier unit.

12. A vehicle seat, comprising:
at least one seat unit including a backrest having a backrest lateral-width;
at least one vehicle seat carrier device including at least one vehicle seat carrier unit, the at least one vehicle seat carrier unit being attached to the backrest of the at least one seat unit, being at least partially spaced apart from the backrest as to form a storage space configured to receive travel accessories, and including
at least one base unit attached to the vehicle seat carrier unit, and
at least one cover unit being reversibly attached to the base unit, having a hollow space between the base unit and the cover unit when attached, the hollow space being configured to store at least one electrical component, the at least one cover unit having at least one electrical component pathway exposing the hollow space through the cover unit;
at least one locking unit configured to lock an object that is pivotably attached to the at least one vehicle seat carrier unit, the at least one locking unit configured to lock the object in a storage position so that the object is secured toward the backrest of the at least one seat unit; and
a backrest bridge extending across and bridging the backrest of the seat unit and having a carrier lateral-width at least substantially equal to the backrest lateral-width of the backrest, the backrest bridge extending substantially parallel to the backrest lateral-width.

* * * * *